United States Patent
Monday et al.

(10) Patent No.: US 7,509,371 B1
(45) Date of Patent: Mar. 24, 2009

(54) APPLICATION DISCOVERY METHOD INCLUDING IDENTIFYING TASK ENTRY POINTS AND LAUNCH POINTS

(75) Inventors: Paul B. Monday, Highlands Ranch, CO (US); Hyoungjin Kim, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 828 days.

(21) Appl. No.: 11/070,515

(22) Filed: Mar. 2, 2005

(51) Int. Cl.
*G06F 15/16* (2006.01)

(52) U.S. Cl. .................. 709/202; 709/223; 709/229; 709/236; 718/106; 718/238

(58) Field of Classification Search .......... 709/202, 709/223, 229, 236; 719/238; 718/106
See application file for complete search history.

(56) References Cited

U.S. PATENT DOCUMENTS

| | | | |
|---|---|---|---|
| 6,167,449 A | 12/2000 | Arnold et al. | |
| 6,219,700 B1 | 4/2001 | Chang et al. | |
| 6,351,467 B1* | 2/2002 | Dillon | 709/227 |
| 6,487,543 B1* | 11/2002 | Ozaki et al. | 709/217 |
| 6,549,932 B1* | 4/2003 | McNally et al. | 709/202 |
| 6,658,465 B1 | 12/2003 | Touboul | |
| 6,801,507 B1 | 10/2004 | Humpleman et al. | |
| 6,839,757 B1 | 1/2005 | Romano et al. | |
| 6,963,906 B2* | 11/2005 | Portuesi | 709/217 |
| 7,065,079 B1* | 6/2006 | Patra et al. | 709/238 |
| 7,080,153 B2* | 7/2006 | Monteiro et al. | 709/231 |
| 2002/0010789 A1* | 1/2002 | Lord | 709/231 |
| 2002/0013823 A1* | 1/2002 | Eubanks | 709/217 |
| 2002/0095488 A1 | 7/2002 | Primak | |
| 2003/0007464 A1* | 1/2003 | Balani | 709/203 |
| 2003/0154242 A1* | 8/2003 | Hayes et al. | 709/203 |
| 2004/0215733 A1* | 10/2004 | Gondhalekar et al. | 709/207 |
| 2005/0080869 A1* | 4/2005 | Bender et al. | 709/212 |

* cited by examiner

*Primary Examiner*—Phuoc Nguyen
(74) *Attorney, Agent, or Firm*—Marsh Fischmann & Breyfogle LLP; Kent A. Lembke

(57) ABSTRACT

A method for performing application and task discovery in a network of computer devices. The method includes broadcasting a request for application data, such as a multicast request, over a communications network. Responses are received from agents on the computer devices and include application data such as an application name or identifier and an application launch point. A list of tasks that each application can run is also typically included in the application data, and associated with each task is a task entry point and a list of elements the task can be run against. Additional element information may be provided for each application including a list of elements managed by each application. The method continues with generating link and launch lists for the network such as a list that includes task identifiers with task entry points or a list that provides application names with launch points.

14 Claims, 3 Drawing Sheets

APPLICATION DISCOVERY METHOD INCLUDING IDENTIFYING TASK ENTRY POINTS AND LAUNCH POINTS

BACKGROUND OF THE INVENTION

1. Field of the Invention

The present invention relates, in general, to discovering and managing applications in a distributed computing environment and in networked computer systems, and, more particularly, a method and corresponding system for discovering applications in a manner that enables an applications manager to manage applications by the tasks they perform and also to provide unique link and launch capabilities such as launching applications at task entry points and at contextualized launch points in management domains.

2. Relevant Background

The growth in networked computers and distributed computing environments has led to a parallel need for mechanisms for managing the operation of these computer networks and environments. Specifically, there are many ongoing developments in the computer industry related to managing the operation of network devices, such as storage arrays, and also to manage the operation and use of software applications performing varied tasks in these networked and distributed computing environments. It often is difficult for a network or system administrator to know what applications are available on a system let alone to fully understand on which physical devices the applications are located and what tasks the applications are capable of performing.

For example, application and/or device management software is rapidly being developed in an attempt to support the changing needs of the data storage industry. Storage and system management software products often are designed to provide a human system administrator with the ability to link to an application and to launch the application, i.e., a "link and launch" function. For example, a topology management product for a storage network may provide an administrator the ability to launch element manager software or applications that relate to various elements, e.g., storage devices or storage services in the storage network(s), that were "found" through an element discovery process. Unfortunately, the existing management products require the administrator to perform guess work and to manually intervene to get the link and launch capabilities working for all the elements or devices in the managed storage network(s). Further, if an element manager or other application that operates to manipulate a number of hardware elements or devices is not co-resident with the managed elements or devices or if the element manager or other application manages more than one element or device, the amount of intervention required of the system administrator to properly manage applications in the network (e.g., to connect applications to devices or features) significantly increases.

Another difficulty for system administrators is related to the fact that most systems and storage management products discover hardware and data services in a network and then, attempt to find a single application that manages all the discovered hardware and data services. However, as applications within a system or network become more and more complex and overlap in their functionality, the concept of finding such a single application becomes increasingly less likely. For example, many products require an administrator to request a customization screen or port and then, to manually type in the location, such as Uniform Resource Locator (URL), for a particular application. The management product may then act to show a link to the application which the administrator can select to link and launch to the application at the location they previously entered. This requires the administrator to utilize discovery tools to find the application or to already know its location.

While some tools exist for assisting in the discovery of applications, these tools each have deficiencies that do not address the problems discussed above. For example, the storage industry developed the Storage Management Initiative Specification (SMI-S) which facilitates defining a point of connection or "Service Access Point" that a software client can use to connect to a service over a network. However, SMI-S based management products still require discovery of an element or device and then, getting the element's software access point. In other words, SMI-S models generally concentrate on discovery devices in a network and then, looking for an application that manages that device. SMI-S also is typically only effective if all devices are configured to support it and many network devices are not, and additionally, SMI-S does not address problems associated with discovering applications not just discovering elements or devices.

The Service Locator Protocol (SLP) is an industry standard protocol which simplifies in many ways the discovery of devices and applications. SLP provides a framework to allow networking applications to discover the existence, location, and configuration of networked services in enterprise networks. For example, SLP uses the multicast networking protocol over a communications network to advertise services, and these multicast advertisements can be received and processed by agents that understand the service advertisements. In order to locate services on a given network using SLP, users of network applications are required to supply the host name or network address of the machine that provides a desired service. However, ensuring that users and applications are supplied with correct information to locate services can cause many administrative problems. Further, many applications that need to be discovered are not "visual" or advertised in the sense required for discovery by SLP and similar protocols. SLP and other protocols often provide only one-to-one mapping between a published or advertised service and a single element or network device but do not provide for an application that manages or is related to more than one network element such as an element manager application.

Due to the limitations of existing discovery tools and location protocols and the deficiencies with management software, there remains a need for an improved method and corresponding system for enabling a system administrator to manage elements of a computer system or network and also to manage applications running in such a system or network. Preferably, such a method would provide an administrator improved discovery capabilities and enhanced link and launch capabilities while also providing the administrator to better understand the tasks performed by applications in a system or network.

SUMMARY OF THE INVENTION

The present invention addresses the above and other problems by providing a method and corresponding systems for discovering applications (rather than devices or elements) including information indicating which devices or elements in a computer system or network that can be managed or are related to the discovered applications. The discovery mechanism is configured to use a communication protocol, such as SLP, to request application information over a communications network or multicast channel in such a network, and each application uses a listener or agent to return application data. The form and content of the application data is typically defined by a discovery template and includes the launch point (e.g., primary Uniform Resource Locator (URL)) for the application and also, information on tasks run by the application and their entry points. The collected template data (or data from a filled in template or template instance) is then organized for use by a system administrator (or a "program fragment" that converts the template to a user consumable format), such as to link and launch particular applications or even particular tasks. The organization of the collected template data may be performed to provide lists or applications and/or tasks that allow an administrator to not only determine quickly which applications are available in a system and which tasks can be performed but also to allow link and launch in context, e.g., to launch at a task entry point on a particular element or device and/or within a particular management domain.

More particularly, a method is provided for performing application and task discovery in a network of computer devices. The method includes broadcasting a request for application data, such as a SLP multicast request, over a communications network. A plurality of responses is received from a set of agents provided on the computer devices. The responses include application data such as an application name or identifier and an application launch point (e.g., a URL). A list of tasks that each application can run is also typically included in the application data, and associated with each task is a task entry point and a list of elements the task can be run against. Additional element information may be provided for each application including a list of elements managed by each application. The method continues with processing the application data from the received responses to generate one or more link and launch lists for the network. A generated link and launch list may be task based and includes pairs of task identifiers and corresponding task entry points. A generated link and launch list may also or alternatively be application based and provide a list of application names or identifiers with the application launch points. In some cases, a generated link and launch list includes a listing of each element discovered along with the managing application(s) and its launch point(s). In yet other cases of a generated link and launch list, a list of elements is provided along with a set of tasks that can be run against the element with their task entry points. The method further may include presenting the link and launch list to a user via a user interface to allow the user to select an application or task to launch in the network.

According to another aspect of the invention, a computer system is provided for supporting application and task discovery. The system includes a plurality of network devices linked to a communications network. Each device includes an application with a launch point, tasks run by the application that each have a task entry point, memory storing a template of application data (e.g., a template instance), and an agent listening on the communications network for an application request. The agents respond to the application request by transmitting the template application data (e.g., a filled in template or template instance) to a broadcaster of the application request. The system also includes a management mechanism linked to the communications network that acts to transmit the application request, i.e., acts as the broadcaster, and to store the transmitted templates of application data from the agents. The application data for each of the applications typically includes an application name, a launch point in the communications network, and a list of tasks that can be run by the application.

The management mechanism may also operate to build a link and launch list with each of the application names paired with an appropriate launch point and may further operate to present the built link and launch list. The application may further include a list of elements managed by each application, and in such cases, the management mechanism may further act to build a link and launch list with each of the managed elements matched with managing applications and their launch points. The application data may also include for each of the tasks a task entry point and a list of elements the task can run against. In these cases, the management mechanism may operate to build a link and launch list providing the tasks and their entry points and/or a link and launch list providing for each of the elements a list of tasks that can run against the element along with their task entry points.

DETAILED DESCRIPTION OF THE PREFERRED EMBODIMENTS

Figure 1:
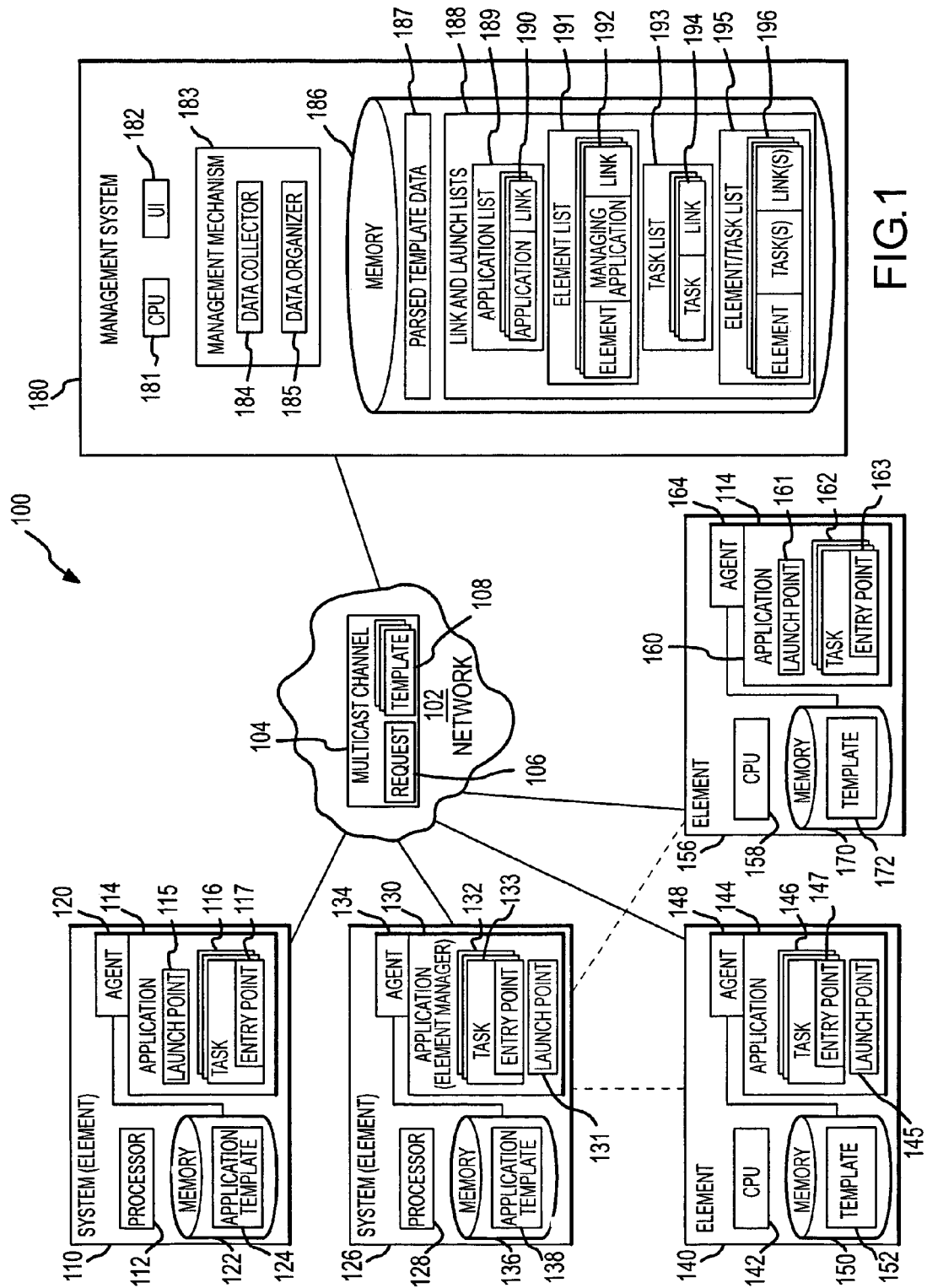
FIG. 1 illustrates a simplified computer network or distributed system adapted for application and task discovery and launching according to an embodiment of the present invention.

In brief, the present invention is directed to an application discovery method (and associated system) that provides the ability to discover applications and to derive the elements (i.e., computer and electronic devices and services) that the discovered applications can manage. The discovery method further collects and organizes data on the tasks that applications can carry out against an element or group of elements in a particular computer system or network. By discovering applications and information about applications from an application-centric direction rather than an element-centric direction, the method of the present invention addresses the prior problem of missing information, which was a problem for prior discovery methods when the device or software that manages a device or element are not in synchronization or when an application is managing a device or data service without the knowledge of the device or data service. As will become clear from the following description, the discovery method of the present invention includes applications announcing one or more launch points or access points, and this allows clients or administrators to launch an application in the context of a particular task (such as at a task entry point rather than at the application launch point). Administrators or users of the methods of the invention do not have to navigate a launched application to the point they need for a particular task. These and other discovery capabilities described herein lead to application and system management mechanisms with more effective application link and launch functions.

In the following discussion, computer and network devices (or "elements"), such as the software and hardware devices within the system 100, are described in relation to their function rather than as being limited to particular electronic devices and computer architectures and programming languages. To practice the invention, the computer and network devices or elements may be any devices useful for providing the described functions, including well-known data processing and communication devices and systems, such as application, database, web, blade, and entry level servers, midframe, midrange, and high-end servers, personal computers and computing devices including mobile computing and electronic devices with processing, memory, and input/output components running code or programs ("applications", "tasks" within such applications, and "services") in any useful programming language, and server devices configured to maintain and then transmit digital data over a wired or wireless communications network.

Data storage systems and memory components are described herein generally and are intended to refer to nearly any device and media useful for storing digital data such as disk-based devices, their controllers or control systems, and any associated software. Data, including transmissions to and from the elements of the network 100 and among other components of the network/systems 100 in "templates" or otherwise, typically is communicated in digital format following standard communication and transfer protocols, such as TCP/IP, HTTP, HTTPS, FTP, and the like, or IP or non-IP wireless communication protocols. The invention utilizes one or more protocols to issue announcements or requests for application data, in the form of templates, and in this regard, a number of protocols may be used to practice the invention. For example, SLP or simple TCP/IP may be utilized to support of multicasting of requests or announcements over a network and its ready support and/or specification of standard listeners or agents. In other cases, JINI or similar protocols may be used, and in these cases, the applications may use JINI or other protocol defined agents or the like to register themselves with the management mechanisms described herein (such as management mechanism 183 of FIG. 1). At this point, it is useful to understand that the discovery method (and corresponding systems) can be built on nearly any communication protocol as important features of the invention include the method of collecting application data, what data is collected, and how that collected data is utilized to support more effective application and/or element management with enhanced link and launch operations.

FIG. 1 illustrates a simplified network or system 100 that is adapted according to one embodiment of the invention for effectively discovering applications in the system 100 and for organizing data gathered from the applications (or from agents running in association with such applications). The system 100 may take a variety of forms to practice the invention and generally, may be an arrangement of computing and/or electronic devices that are communicatively linked by a wired or wireless communications network 102. The discovery method of the invention is particularly well suited, for example but not as a limitation, for use with a system 100 that includes systems or elements used for data storage and managing data storage, e.g., storage area networks, networks of disk devices such as arrays and servers, and the like. In the description, the terms system, element, and device are used somewhat interchangeably to refer to the physical components operating on the network 102, and in some cases, an "element" can also be used to refer to a service or to another application because in some cases applications are configured for managing or interacting with services or other applications and not just for managing physical or hardware components.

As shown, the system 100 includes system (or element) 11 and system 126, which are each linked to the network 102. System 126 is shown with dashed lines to be able to manage or control elements 140, 156 that are also linked to the network 102. For example, the system 126 may be host or management system or element that operates to manage a plurality of storage arrays or other devices, such as elements 140, 156. Each of the systems/elements 110, 126, 140, 156 are configured to be able to provide a predefined set of application (and/or task) information in response to a request 106 issued on the network 102 by the management system 180, e.g., a SLP request 106 over a multicast channel 104 on the network 102.

To this end, each system/element 110, 126, 140, 156 includes a processor or CPU 112, 128, 142, 158 used to manage operation of the systems or elements including running at least one application 114, 130, 144, 160, respectively. To listen for and respond to the request 106, the systems or elements 110, 126, 140, 156 further include a listener or agent 120, 134, 148, 164 which may be associated with the application 114, 130, 144, 160 (e.g., one agent per application or in some cases, one agent per element which listens for more than one application). Each application 114, 130, 144, 160 is shown to have a launch point 115, 131, 145, 161 which defines an access point for the applications on their physical device and on the network 102, and in one embodiment, is the primary URL for the application 114, 130, 144, 160.

An important feature of the invention is the ability to better discover and manage portions of applications or tasks that can be run by the application. In this regard, each application 114, 130, 144, 160 is shown to include one or more tasks 116, 132, 146, 162 (or a set of tasks) that the underlying application can run. Additionally, a task entry point 117, 133, 147, 163 is provided for each of the tasks 116, 132, 146, 162 defining an access point directly to the task, which is often given relative to the launch point or primary access point for the corresponding application 114, 130, 144, 160. These abstract features or access points are shown in FIG. 1 to better illustrate that in the system 100 the applications can be the target of a link and launch by the management system 180 or a link and launch can be made directly to a task on a particular element in the system 100. In some cases, the application 130 may be an element manager and a task 132 specified for application 130 may be linked and launched in context for one of the elements 140, 156.

Figure 2:
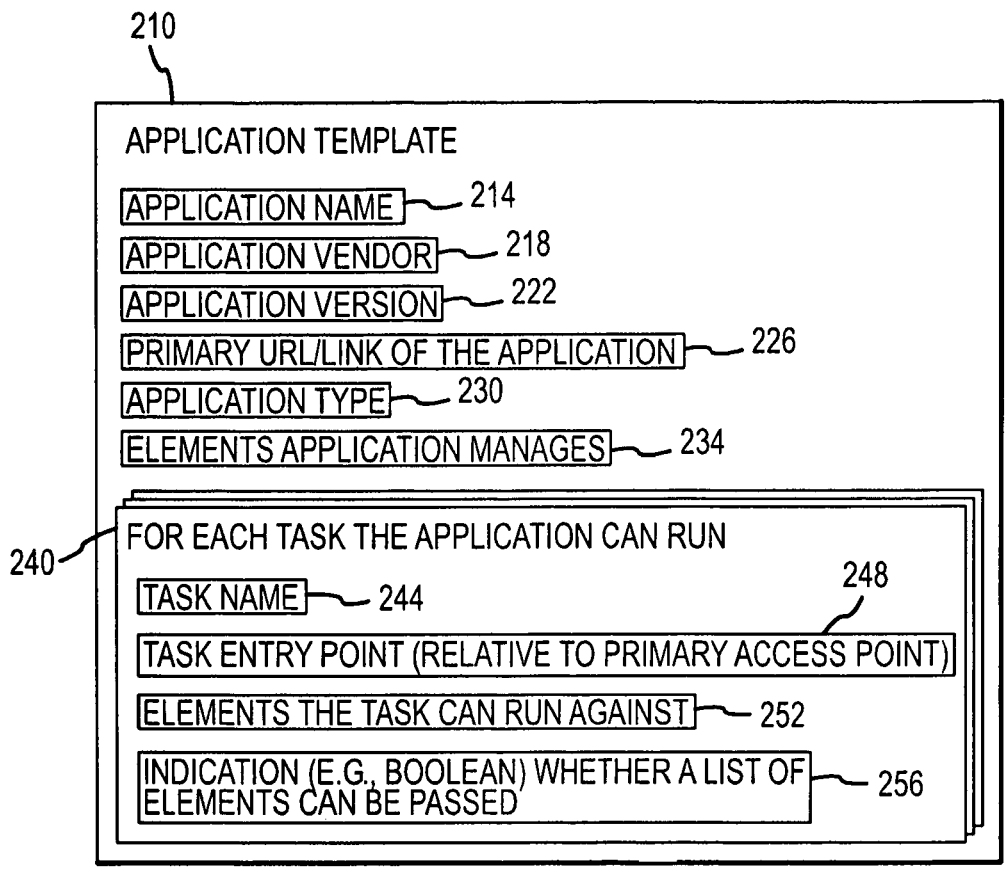
FIG. 2 illustrates an exemplary application template that may be returned by a listener or application agent such as during operation of the system of FIG. 1.
Figure 3:
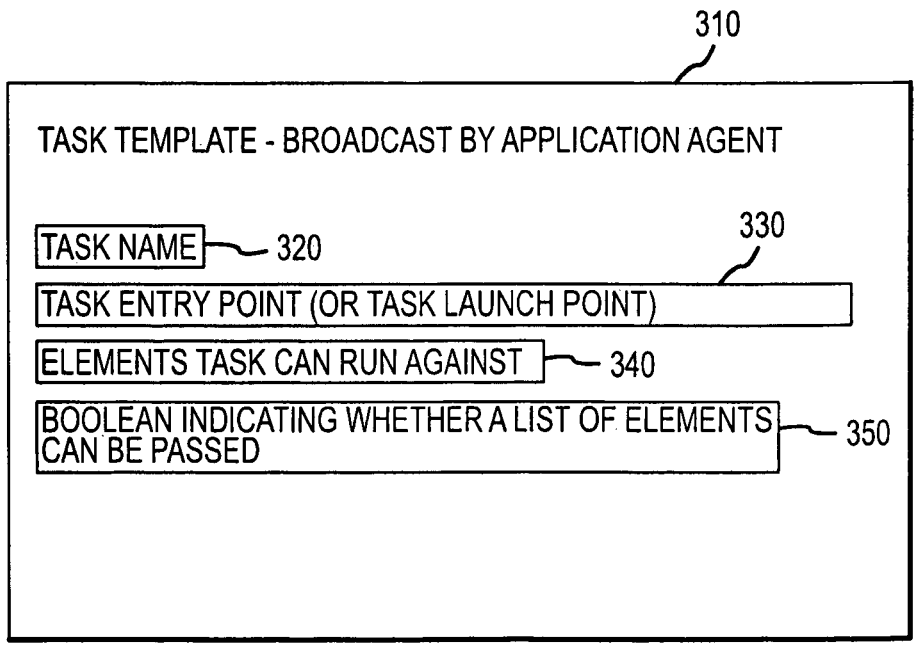
FIG. 3 illustrates an alternative template that may be returned by a listener or application agent during operation of FIG. 1 to assist in discovery of tasks without application information and of task entry points.

The system 100 supports collection of particular application and link and launch data. To support this function, the systems or elements 110, 126, 140, 156 include memory 122, 136, 150, 170 that stores a set of data 124, 138, 152, 172 for transmittal to the management system 180 in response to a request 106. As shown, the data is stored in the form of a filled in template or template instance (as will be explained in detail with reference to FIGS. 2 and 3). The returned template 108 (e.g., a filled in template or a template instance) is transmitted over the network 102, such as via the SLP or other protocol channel 104, for use by the management system 180. As is explained below, the agents 120, 134, 148, 164 function to monitor the channel 104 for a request 106 for information from applications with particular template configurations and when the agent 120, 134, 148, 164 identifies a request 106 for a matching template, they respond by transmitting the template information or template-based response 108 which includes the template data 124, 138, 150 and/or 172 as appropriate and formatted as required by the protocol used to support the channel 104.

The management system 180 is linked to the network 102 and generally functions to discover applications and tasks in the system 100, to process and organize the collected data into link and launch ready lists or data sets, and to facilitate system administration including linking and launching to particular application launch points and to particular task entry points. As shown, the management system 180 includes a CPU 181 managing operation of the system 180 including running a user interface 182 that includes user (or an administrator) input and output functionality and management mechanism 183. The CPU 181 also manages operation of an included memory 186 (which may be provided on a separate device(s) or on the same device/system as shown).

The management mechanism 183 (e.g., one or more software applications) includes a data collector 184 and a data organizer 185. The data collector 184 acts to periodically (such as every 30 minutes, every hour, or other shorter or longer time period) broadcast the request 106 for application templates or template data. The data collector 184 also functions to process or parse the received templates or template data 108 and to store the parsed template data 187 for use by the data organizer 185. The data organizer 185 in turn acts to generate one or more link and launch lists 188 that are also stored in memory 186 for later presentation to a user or administrator, such as by the management mechanism 183 via the UI 182, to allow the user or administrator to selectively link and launch tasks or applications in the system 100.

The content of the link and launch lists 188 may vary to practice the invention. As shown, an application list 189 is created that includes the link and launch elements 190 which provide the discovered applications and their link or launch point. An element list 191 is provided with link and launch elements 192 that provide information regarding each element 110, 126, 140, 156 and the associated managing application(s) with their launch points. Another list that may be prepared by the data organizer 185 is a task list 193 that provides sets of link and launch elements 194 that include each task that may be run in the discovered elements of the system 100 and their task entry point or link. Additionally (or alternatively), an element/task list 195 may be prepared with link and launch elements 196 that provides for each discovered element in the system 100 a set of tasks that can be run on that element and the link or task entry point for each task in the set. The creation and use of these lists is an important feature of the invention and is explained in more detail below with reference to FIG. 4.

The set of data 124, 138, 152, 172 stored by each system 110, 126, 140, 156 for each of its applications 114, 130, 144, 160 and returned as templates or template data 108 is generally defined by an application template. The application template can be considered the mechanism used by the applications for announcing their availability in the system 100. For example, an application template 210 of the form shown in FIG. 2 may be used to define what information is stored for each application in system 100 (or the applications being made available on system 100 as the invention does not require that every application in a system or in an element be made available to management system 180) with data being provided for each applicable field in most cases.

As shown, the application template 210 includes a number of fields related to the application and to the tasks run by the application. For example, information may be provided regarding: the name of the application in field 214; the application vendor in field 218, the application version in field 222; the primary URL or link of the application in field 226, the application type (such as http, x, cli, or the like) in field 230, and elements the application manages in field 234. Field 226 is included to gather the application launch point in the system 100. Field 234 is useful for allowing the gathered information to be processed so as to list the applications by the elements they can manage, which is often very useful for element management such as in a data storage environment. A subset of fields 240 are provided for each task that the named application can run, and these fields may be used to provide: a task name in field 244, a task entry point 248 (such as a launch point relative to the primary access or launch point of the application), elements that the task can be run against in field 252, and an indication (such as Boolean value) whether a list elements can be passed to the task in field 256.

Of course, to practice the invention, the specific fields provided in the template 210 may be varied with more or less fields being used to collect the application and task data and the specific data collected and its format may also be varied. In a preferred embodiment, fields 226, 234, 248, and 252 are included to facilitate creation of link and launch lists that provide an administrator with significantly improved management capabilities including the ability to quickly identify applications and tasks in a system and which elements the applications and tasks are associated with and to launch the applications and the tasks directly with or without reference to particular elements.

It may be useful to provide an example of the set of template data that may be returned in template data 108 from an element manager, such as element 126, during operation of the system 100. The application name may be "3510 Multi-element Manager" and the application vendor may be "Sun Microsystems, Inc." The version may be "1.0" or other similar version indication. The primary launch point may be a URL similar to https://anetworkhost.central.companyname.com:6789/3510em. The application type may be "https" and the elements that application can manage may include identifiers or names for elements 140 and 156 (such as "array1" and "array2" or the like). An exemplary task run by this application may be "provision a LUN" and the task entry point may be provided relative to the primary access point simply as "/provision" or the full link may be provided to define the task entry point. The elements that the task can run against may be all elements managed by the application and be defined as "array1, array2" in this example (i.e., elements 140, 156). Finally, a "true" (or "false") value may be passed in the list passing field 256 of the template 210. As will be appreciated by those skilled in the art, the set of data collected in the template 210 is very useful to a system (or element) administrator and facilitates effective and efficient management of operations in the system or network such as system 100 of FIG. 1.

In some embodiments of the invention, the request 106 is used by the management system 180 to collect task information for the system 100 without reference to the application information. In these embodiments, the template data 124, 138, 152, 172 stored and later passed or returned as template data 108 to the management system 180 differs from that of template 210, and may be defined by the template 310 in FIG. 3. The task template 310 is also broadcast by application agent 120, 134, 148, 164 but only includes the following fields: the task name 320, the task entry point 330, the elements the task can run against 340, and an indication of whether a list elements can be passed to the task 350. In this embodiment, the task entry point 330 would typically include all information for launching directly to the task, such as the URL of the primary access of the associated application and the relative entry point for the task.

Figure 4:
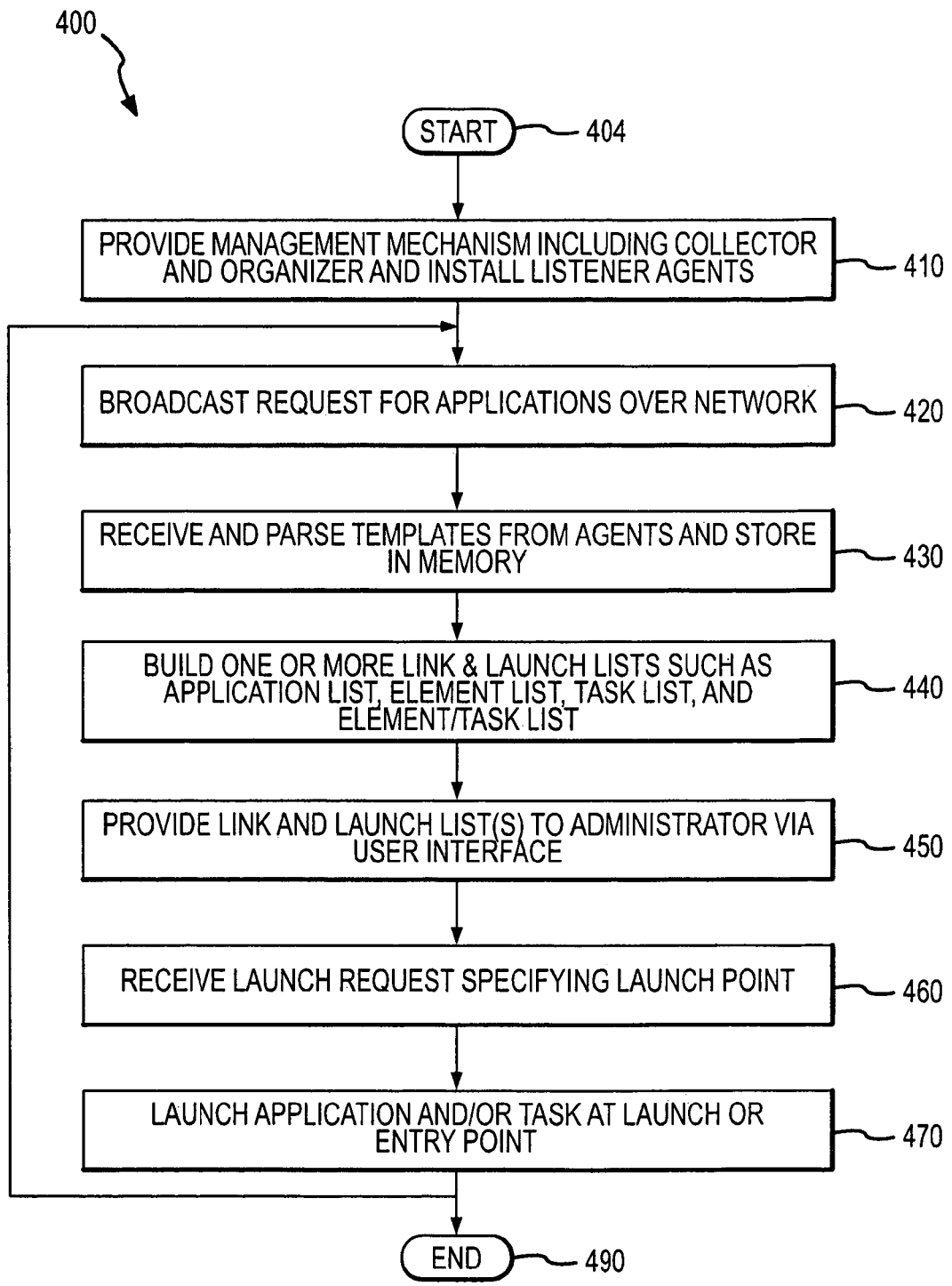
FIG. 4 is a flow diagram of a method of application discovery and system management according to an embodiment of the present invention.

FIG. 4 illustrates an application discovery method 400 according to an embodiment of the invention, which will be explained with reference to the exemplary system 100 of FIG. 1. The method 400 starts at 404, such as with the selection of a system 100 for running the method 400 and determining which data to collect from applications, such as via template 210 or template 310 (in other words, will the system 100 be run to gather application and task data or more specifically to collect task-centric data). At 410, the method 400 continues with providing the management mechanism 183 on a management device or system 180 that is linked to a network 102. The management mechanism 183 typically will be adapted with a data collector 184 and data organizer 185 (or application and element organizers) as were described above with reference to FIG. 1. Further, at 410, a number of listeners or agents 120, 134, 148, 164 are installed or loaded on each system or element 110, 126, 140, 156 that includes an application that will be made available in the system 100 (and in some cases, multiple agents will be provided for each system or element to provide one for each application running on a system or element).

At 420, a request, such as a SLP or other protocol request or announcement, 106 is generated or broadcast by the data collector 184, e.g., a multicast announcement over channel 104 in network 102. The request 106 asks for a response from all applications having a template data set (such as template 210, 310) including a copy of the template data 124, 138, 152, 172 in the form of a template response 108, e.g., a completed or filled in template or template instance. At 430, the data collector 184 receives the template data 108 from the responding applications (or agents). The data collector 184 acts to parse the data and stores the parsed template data 187 in memory 186 for further processing by the data organizer 185.

At 440, the data organizer 185 processes the parsed data 187 to generate one or more link and launch lists 188 for later use by a system administrator to manage the elements 110, 126, 140, 156. As shown in FIG. 1, the form of these lists 188 may vary to practice the invention. For example, the data organizer 185 may process the data 187 to build a list of applications 189 that can be used by administrators to link and launch the applications 114, 130, 144, 160 at their corresponding launch points 115, 131, 145, 161 as enabled by link and launch elements 190, which pair the application name with its primary access point (e.g., a URL). In addition or alternatively, the organizer 185 may build an element list 191 with link and launch elements 192 providing a list of elements with a link and launch to the applications that manage them. Yet further, the organizer may also or instead build a task list 193 that provides in link and launch elements 194 a list of tasks a user can launch and provides the task access point in that application to allow launching of the task. In some cases, the organizer 185 may instead or in addition process the data 187 to build a list of elements 195 that provides in link and launch elements 196 tasks that can be run on that element and links or task entry points for those tasks on that element.

The method 400 continues at 450 with the management mechanism 183 providing (such as via user interface 182) a set of the available lists 188 and then, responding to a selection by a user by providing a selected one of the link and launch lists 188. In some cases, it may be useful to provide more than one of the lists 188 to the user at a time to facilitate element management in the system 100. At 460, the user is allowed to link and launch from the user interface 182, and the method 400 continues with receiving a launch request from a user specifying a launch point such as an application launch point or a task entry point for a task run by a particular application on a particular element 110, 126, 140, 156 in the system 100. At 470, the method 400 continues with launching the application and/or task at the specified launch or entry point. Typically, the method 400 would then continue at 420 with another periodic broadcast of the request 106 from the collector 184 but may also be terminated at 490.

As can be seen from the description of the method 400, once the management mechanism 183 discovers the applications and tasks available on the network 102, the mechanism 183 (and an administrator using the system 180) can use the discovered information 187, 188 for a variety of purposes. The mechanism 183 can produce a task list (such as list 193) that allows a user to pick the elements that they want to operate against, and then, the mechanism 183 can be configured to automatically choose the application that they should use to manage the elements. The mechanism 183 can also be used to produce a list of element managers for a particular element, such as list 191, without requiring manual intervention to wire up elements with their managers.

It will also be readily understood that the method 400 is particularly well suited for use in a storage management environment. For example, an application may be launched to perform a variety of tasks such as provisioning storage, getting a capacity report, managing alarms, provisioning a LUN, creating a zone (e.g., for a switch application), deleting a volume, managing a storage pool, and/or other storage-related tasks. Each of these tasks typically will have a unique task entry point (e.g., a different URL), which once discovered as discussed above, can be used to allow an administrator to launch a task directly rather than its application. This allows linking in context as a task may be launched to for a specific element. In the storage implementation, an administrator can use the method 400 to not only launch a specific task but a specific task in an element manager for a particular element (such as one of the tasks 132 in element manager 130 for one of the elements 140, 156 being managed by element manager 130).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The method generally involves placing formality around a definition of a specific networked visual component, such as an application or task, that is offered on a network. The method builds on a generic, multicast location protocol by providing a specification around publishing a unique type of service such as a network or web-based application and its tasks. A specification is provided for publishing to administrators or users task entry points within the discovered, available applications, and the method also provides an overall algorithm and blueprint for consumption of these published applications and entry points to meet at least some of the discovery and management needs of coarse grained web-based management applications.

The method can be thought of as providing a management environment that facilitates managing software available in a network that in turn manages elements, e.g., devices and services, within that network. As should be clear from the above description, the method and systems of the invention eliminate the need for manual intervention when configuring link and launch capabilities for related management applications. The ability to launch applications is enhanced as the applications can be launched according to some embodiments of the invention based on the tasks the applications achieve rather than on the elements managed by the applications. The method and systems of the invention also provide dynamic association so that if an application goes offline the application list created by the management mechanism 183 is automatically updated through the periodic polling of applications and repeated performance of steps of the method 400. The inventive method and systems also provide better control over the software management environment and its relationship to the elements in the management environment.

We claim:

1. A computer-based method for performing application and task discovery in a network of computer devices running applications, comprising:
broadcasting a request for application data over a communications network;
receiving a plurality of responses over the communications network from a set of agents provided on the computer devices, the responses comprising the application data; and
processing the application data from the received responses to generate a link and launch list for the network;
wherein the application data comprises for each application associated with each of the agents an application identifier and a launch point,
wherein the application data comprises for each application associated with each of the agents a set of task data for each task the corresponding application can run, the set of task data including a task identifier and a task entry point defining a task entry point for a task associated with the task identifier; and
wherein the application data further comprises for each of the applications associated with the agents a list of elements managed by each of the applications and wherein the link and launch list comprises each of the listed elements paired with the application identifier associated with an application managing the particular element and the launch point for the managing application.

2. The method of claim 1, wherein the application launch point is a Uniform Resource Locator (URL).

3. The method of claim 1, wherein the link and launch list comprises a list comprising a listing of pairs of the application identifiers and the launch points.

4. The method of claim 1, wherein the link and launch list comprises a listing of pairs of the task identifiers and the task entry points.

5. The method of claim 1, wherein the application data further comprises for each of the tasks a list of elements that can run against the particular task and wherein the link and launch list comprises each of the listed elements paired with a set of tasks that can run against the element and the task entry points for each of the tasks in the set.

6. The method of claim 1, further comprising presenting the link and launch list on a user interface.

7. The method of claim 1, further comprising installing the agents on the computer devices and storing the application data in memory on the computer devices, and wherein the application data comprises a template with fields defining a set of application data including a primary URL for the application and a list of elements the application manages and defining a set of task data for each task run by the application including a task entry point relative to the application primary URL and a list of elements that task can run against.

8. A computer-based method for performing application and task discovery in a network of computer devices running applications, comprising:
broadcasting a request for application data over a communications network;
receiving a plurality of responses over the communications network from a set of agents provided on the computer devices, the responses comprising the application data; and
processing the application data from the received responses to generate a link and launch list for the network;
wherein the application data comprises for each application associated with each of the agents an application identifier and a launch point,
wherein the application data comprises for each application associated with each of the agents a set of task data for each task the corresponding application can run, the set of task data including a task identifier and a task entry point defining a task entry point for a task associated with the task identifier; and
wherein the application data further comprises for each of the tasks a list of elements that can run against the particular task and wherein the link and launch list comprises each of the listed elements paired with a set of tasks that can run against the element and the task entry points for each of the tasks in the set.

9. The method of claim 8, wherein the application launch point is a Uniform Resource Locator (URL).

10. The method of claim 8, wherein the link and launch list comprises a list comprising a listing of pairs of the application identifiers and the launch points.

11. The method of claim 8, wherein the link and launch list comprises a listing of pairs of the task identifiers and the task entry points.

12. The method of claim 8, wherein the application data further comprises for each of the applications associated with the agents a list of elements managed by each of the applications and wherein the link and launch list comprises each of the listed elements paired with the application identifier associated with an application managing the particular element and the launch point for the managing application.

13. The method of claim 8, further comprising presenting the link and launch list on a user interface.

14. The method of claim 8, further comprising installing the agents on the computer devices and storing the application data in memory on the computer devices, and wherein the application data comprises a template with fields defining a set of application data including a primary URL for the application and a list of elements the application manages and defining a set of task data for each task run by the application including a task entry point relative to the application primary URL and a list of elements that task can run against.

* * * * *